UNITED STATES PATENT OFFICE.

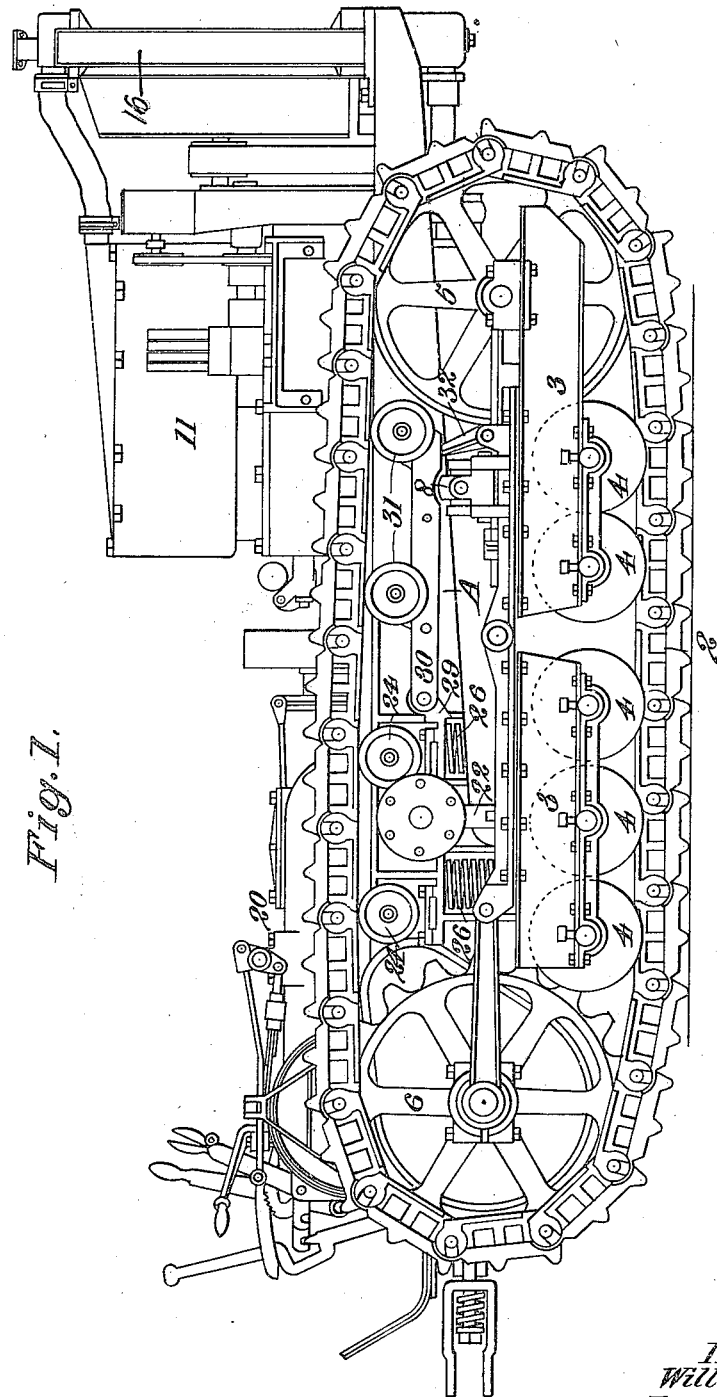

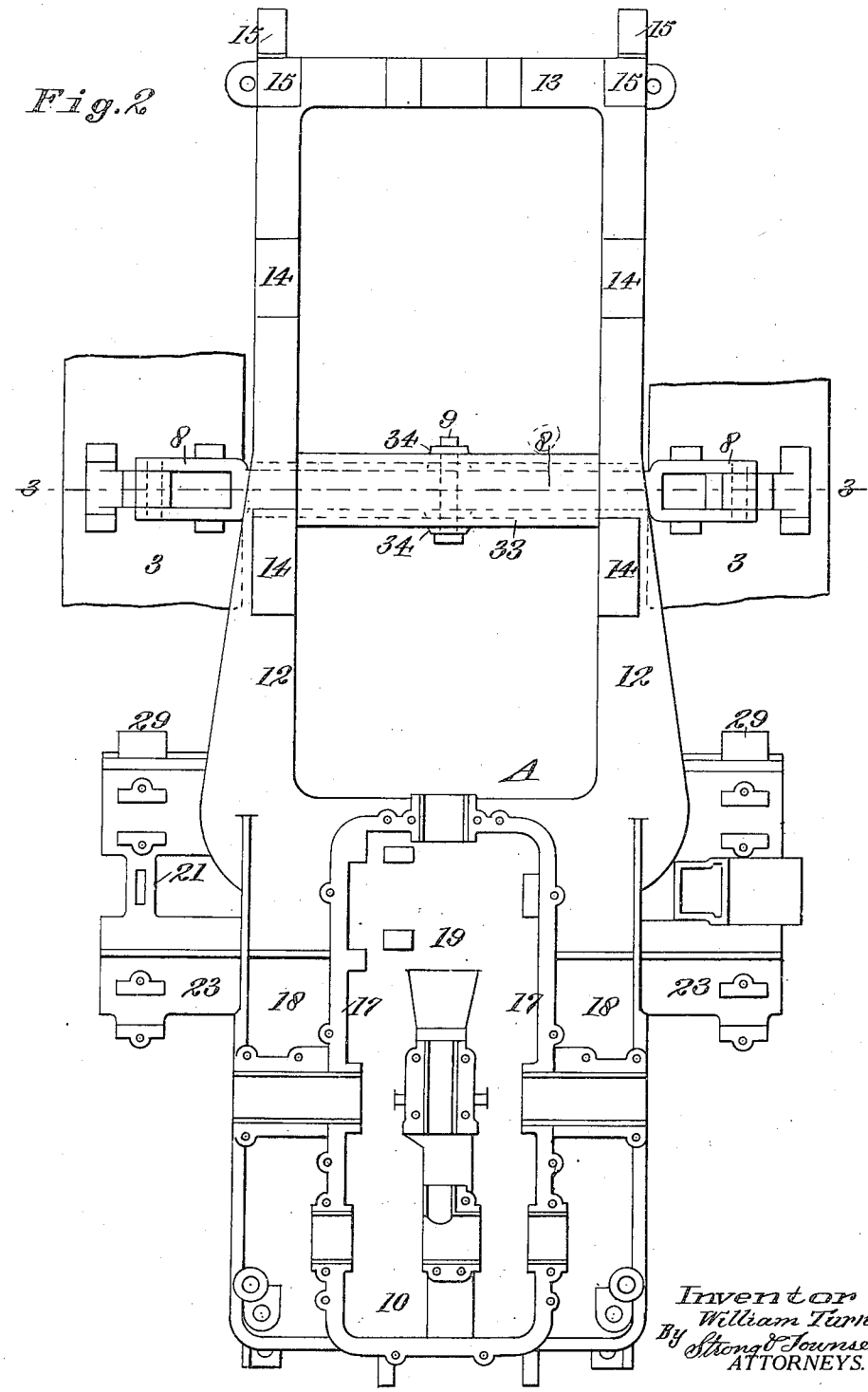

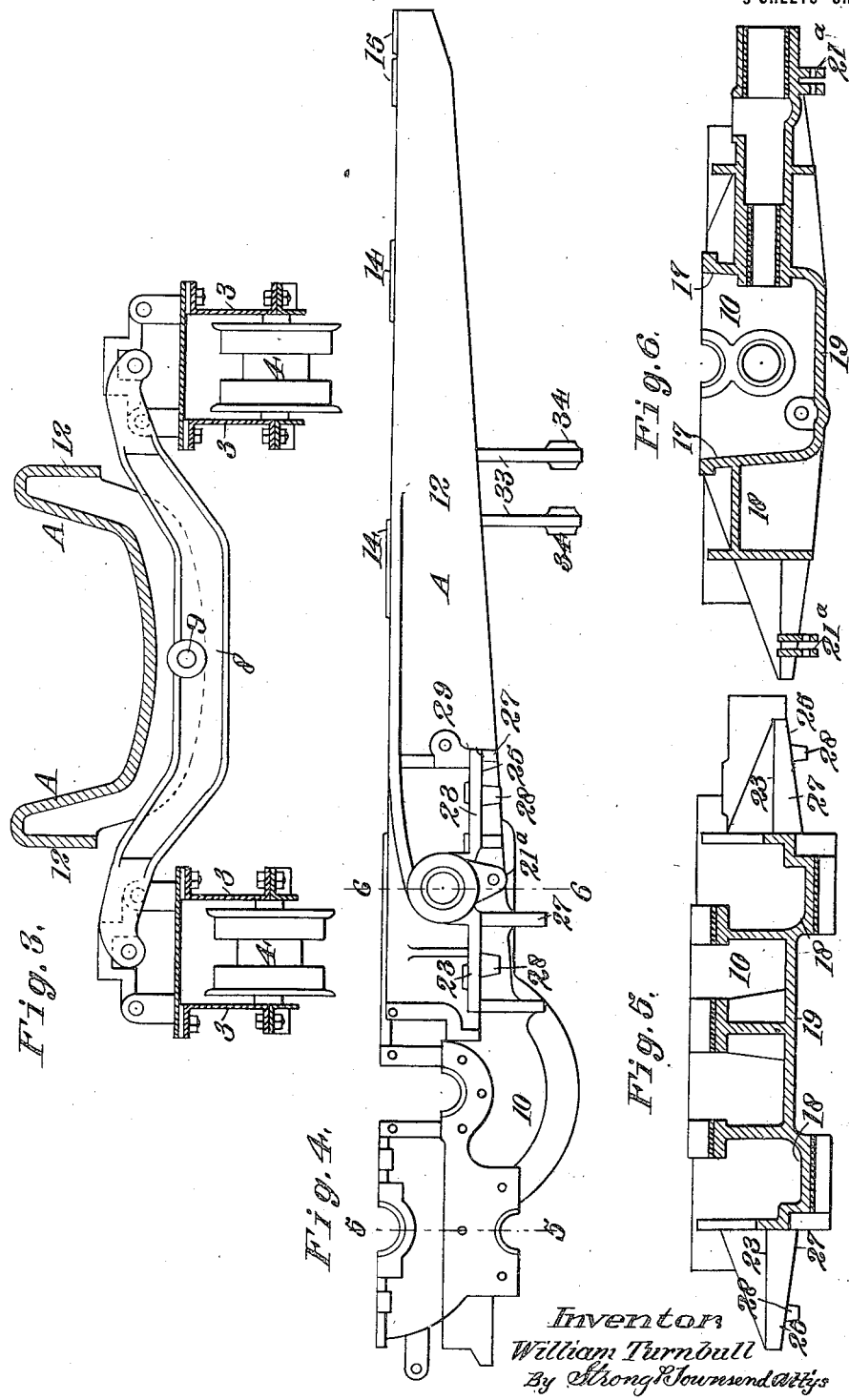

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTION-ENGINE FRAME.

1,282,328. Specification of Letters Patent. Patented Oct. 22, 1918.

Original application filed February 10, 1916, Serial No. 77,382. Divided and this application filed December 26, 1917. Serial No. 208,956.

*To all whom it may concern:*

Be it known that I, WILLIAM TURNBULL, a citizen of the United States, residing at Peoria, in the county of Peoria and State of Illinois, have invented new and useful Improvements in Traction-Engine Frames, of which the following is a specification.

This invention relates to traction engines of the self-laying track type shown and described in my co-pending application Ser. No. 77,382, filed February 10th, 1916, of which this is a divisional application.

The object of the invention is to simplify and improve the construction and operation of machines of this sort by providing them with a novel form of main frame.

In carrying out this object a one-piece casting is so formed that it provides the tractor with a unitary frame having as integral parts thereof a dust-proof housing for the transmission mechanism and means to detachably receive and support a motor, together with means at either side of one end of the frame to support said frame upon the chain track mechanisms, and means at the other end to support it at a point midway between said chain track mechanisms.

This construction provides a flexible three-point connection between the body of the tractor and the chain track mechanisms and eliminates all twisting strains on the engine and transmission mechanisms. Moreover, the transmission bearings and supports being all cast integral with the frame, the transmission shafts and gearing can be assembled with ease and accuracy and maintained in proper alinement without the use of universal joints between the engine and transmission mechanisms.

One form which the invention may assume is exemplified in the following description and illustrated in the accompanying drawings, in which—

Figure 1 is a side elevation of a tractor embodying the invention.

Fig. 2 is a plan view of the frame, showing the method of supporting the forward end thereof on the self-laying track mechanisms.

Fig. 3 is a cross sectional view on line 3—3 of Fig. 2.

Fig. 4 is a side elevation of the frame.

Fig. 5 is a cross sectional view on line 5—5 of Fig. 4.

Fig. 6 is a similar view on line 6—6 of Fig. 4.

A represents the frame or chassis of the vehicle, supported by means hereinafter to be described on a pair of endless, flexible, self-laying track belts or members 2. Within each track member is a truck frame 3 having wheels or rollers 4 adapted to run on the track formed on the inner side of the track member. The forward end of the truck frame 3 supports an idle sprocket 5, around which the traction member passes back to the drive sprocket 6 suitably journaled on the frame A.

The rear end of the frame A is directly supported on the rear of the truck frame 3 by springs 26, there preferably being two sets of springs for each rear truck section, as shown. The front end of the frame is supported on the forward end of the truck frame 3 through the medium of an equalizing bar 8 which is pivoted centrally to and beneath frame A at 9; the ends of bar 8 being pivoted to the truck frames by suitable pivotal joints. This form of mounting constitutes as near as possible a three-point suspension for the main frame and adds materially to the flexibility of the traction members.

The transmission and steering mechanism for the tractor is carried as a unit in a casing 10 on the main frame, and power to operate the traction belts is derived from a suitable motor 11 also mounted on the main frame.

The casting A, which is rectangular in shape, preferably, comprises side bars 12, L-shaped at their forward ends, with their horizontal flanges arranged at the top and directed inwardly, and an end piece 13 of similar shape connecting the forward ends of said bars. The forward portion of the frame carries finishing pads 14 for receiving the engine, and projecting parts 15 are formed at the forward end of the frame to receive the radiator 16.

Near the rear end of the frame is located the transmission casing 10 of rectangular form, having its sides 17 connected by horizontal webs 18 with the side bars of the frame and provided with an inclosed bottom 19. The top of the transmission casing, which is flanged and bored to receive a detachable cover 20, is on a level with the pads 14 to facilitate machining of the casting. Various supports and bearings are provided in the part of the frame forming the transmission housing to suit the particular type of transmission mechanism employed, those here shown being merely for the purpose of illustration.

On the outer side of each frame side bar is a flange member 21, formed with a perforated ear 21ª to receive a supporting link 22 which is pivoted to the rear of the truck frame 3. To either side of the link connection 22 is a ledge 23 forming a bearing for a guide roller 24, a plurality of which rollers are employed in traction engines of this sort to support the upper run of the endless track.

Beneath each ledge 23 is a channel 25 to receive the supporting springs 26, and these channels are provided with strengthening webs 27 extending transversely beneath the frame and connecting the channels at opposite sides. Lugs 28 are arranged in the channels to seat said springs. On the front ledge 23 is a perforated ear 29 to pivotally receive a forwardly extending link 30 which carries two more guide rollers 31 similar to the rollers 24. The front end of the link 30 is supported pivotally by a second link 32 carried on the front of the frame 3. Near the forward end of the frame is a transverse channel-shaped member 33 dropped below the frame and provided at its center with a transverse bearing support 34 connected by a pivot pin to the equalizing bar 8.

Many changes in the construction and arrangement of the several parts illustrated and described herein may be employed without departing from the spirit of the invention as disclosed in the appended claims.

Having thus described my invention, what I claim and desire to secure by Letters Patent is—

1. In a traction engine, a main frame for carrying the motor and transmission mechanism, said frame comprising a one-piece casting in rectangular form provided with supporting pads for the motor, and an integral casing for the transmission gearing.

2. In a traction engine, a main frame for carrying the motor and transmission mechanism, said frame comprising a one-piece casting in rectangular form provided with supporting pads for the motor, an integral casing for the transmission gearing, and top flanges on the transmission casing to receive a detachable cover, said flanges and pads being on a level and having finished surfaces.

3. In a traction engine, a main frame comprising L-shaped side bars and a front end piece, the former projecting to receive a radiator, supporting pads on the side bars and end piece to receive a motor, and a transmission casing made integral with the frame and provided with inclosed sides and bottom.

4. In a chain track tractor having its entire weight supported upon chain track mechanisms, a one-piece casting forming a unitary frame having as integral parts thereof a casing for a transmission mechanism, supporting pads for a motor, and extended members forming a three-point support for said frame on the chain track mechanisms.

5. In a chain track tractor having its entire weight supported upon chain track mechanisms, a one-piece casting forming a unitary frame having as integral parts thereof a casing for a transmission mechanism, supporting pads for a motor, a dependent member at one end of the frame affording a bearing for a central pivot, and seats at either side of the other end of the frame to receive supporting springs.

6. The combination with a chain track tractor having its entire weight supported on a pair of chain track mechanisms, of a one-piece casting forming a main frame having as integral parts thereof a dependent member at one end to support the frame midway between the chain track mechanisms, and members at either side of the frame to support the other end thereof on said mechanisms.

7. The combination with a chain track tractor having its entire weight supported on a pair of chain track mechanisms, of a one-piece casting forming a main frame having as integral parts thereof a dependent member at one end to support the frame midway between the chain track mechanisms, members at either side of the frame to support the other end thereof on said mechanisms, and a casing for a transmission gearing.

8. In a chain track tractor having its entire weight supported upon chain track mechanisms, a one-piece casting forming a unitary frame having as integral parts thereof a casing for a transmission mechanism including supports for the parts of said mechanism, supporting pads for a motor, and extended members forming a three-point support for said frame on the chain track mechanisms.

9. In a traction engine, the combination of a main frame, a motor detachably carried thereon, and transmission mechanism received on the frame and rigidly connected to the motor, said frame comprising a one-piece casting with means to receive and support the motor, and a housing for the transmission formed integrally thereon.

10. In a traction engine, the combination of self-laying track carriages, a main frame to detachably receive the motor and transmission mechanisms, and means supporting said frame on the carriages at three points, said frame comprising a one-piece casting, with means to receive and support the motor and a housing for the transmission formed integrally thereon.

11. In a traction engine, the combination of self-laying track carriages, a main frame to receive the motor and transmission mechanisms, means supporting said frame on the carriages at three points, said frame comprising a one-piece casting having side bars and a front end piece arranged to receive the motor, and a reinforcing member extending transversely of the frame to pivotally receive an equalizing bar for connection with the carriages at opposite ends.

12. In a traction engine, the combination of self-laying track carriages, a main frame to receive the motor and transmission mechanisms, means supporting said frame on the carriages at three points, said frame comprising a one-piece casting having side bars and a front end piece arranged to receive the motor, a reinforcing member extending transversely of the frame to pivotally receive an equalizing bar for connection with the carriages at opposite ends, and channel-shaped members extending from the side bars of the frame to receive supporting springs arranged on the carriages.

In testimony whereof I have hereunto set my hand in the presence of two subscribing witnesses.

WILLIAM TURNBULL.

Witnesses:
L. B. NEUMILLER,
EDWIN M. SMITH.